United States Patent [19]

Fick

[11] Patent Number: 4,470,088

[45] Date of Patent: Sep. 4, 1984

[54] PIVOT SUSPENSION FOR HEAD ARM ON DISK DRIVE

[75] Inventor: Adolf L. Fick, Cupertino, Calif.

[73] Assignee: Xerox Corporation, Stamford, Conn.

[21] Appl. No.: 338,445

[22] Filed: Jan. 8, 1982

[51] Int. Cl.³ .......................... G11B 5/54; G11B 21/22
[52] U.S. Cl. ..................................................... 360/105
[58] Field of Search ................................. 360/105, 109

[56] References Cited

U.S. PATENT DOCUMENTS 4,209,813  6/1980  Bryer ..................................... 360/105

Primary Examiner—Robert S. Tupper
Attorney, Agent, or Firm—Serge Abend

[57] ABSTRACT

An improved pivot arrangement for the arcuately movable transducer head support arm of a floppy disk drive, wherein the pivot comprises at least partially spherical bearing surfaces located between the movable support arm and its support, the bearing surfaces being seated in positioning bearing recesses formed in either the support arm or its support.

9 Claims, 5 Drawing Figures

PIVOT SUSPENSION FOR HEAD ARM ON DISK DRIVE

This invention relates to an improved pivot arrangement for the movable, or "flying", head arm of a floppy disk drive, wherein the pivot comprises at least partially spherical surfaces urged into suitable recesses.

Flexible magnetic disks are made of a thin pliant plastic support material coated upon one or both planar surfaces with a thin film of magnetic material. Magnetic information is stored upon one or both sides of a disk, in concentric rings or "tracks". This is accomplished by means of magnetic transducers, in the form of a well known read/write gap, mounted upon a slider head which also generally carries an erase gap. In a double-sided floppy disk drive system, two slider heads are used, one disposed for use with each surface of the flexible media. The two slider heads are arranged so that they "fly" across the media at a very close distance in a manner to accomplish an optimum compromise between high read/write performance, for achieving the desired recording and reading interaction between the transducers and the magnetic surface, and low wear characteristics.

In order to access data upon a given disk track, the slider head carrying the transducer must be moved radially. This procedure must be accomplished extremely rapidly and accurately. Clearly, if rapid and accurate recording and retrieval of information is to be achieved, alignment of the transducer gaps upon or both sides of the disk must be maintained. In the past, positional integrity has often been difficult to maintain as the disk drive is subject to long term, sometimes abusive, usage.

Typically, in a double-sided floppy disk arrangement, the slider heads are mounted upon the ends of two arms: one arm, generally termed the "carriage" is fixed against movement in a direction normal to the plane of the disk; the other arm is cantilever mounted in overlying relation to the fixed arm, is flexibly supported for pivotal movement toward and away from the disk, and is mechanically urged toward the disk with a slight bias force. Each time a disk is introduced into the drive, the movable head must be separated from the fixed head to allow sufficient clearance for the disk to be passed between the slider heads. Once the disk is in position relative to its drive spindle, the movable arm is again pivoted toward the disk into proper biased relationship with the fixed arm and the disk. The manner in which the pivot action has been achieved in prior art disk drives is well illustrated in U.S. Pat. Nos. 3,931,641, 4,151,573 and 4,167,766. In each of these drives, the movable arm has been secured by means of a spring hinge element. U.S. Pat. No. 3,931,641 shows a single-sided floppy disk arrangement while U.S. Pat. Nos. 4,151,573 and 4,167,766 show double-sided floppy disk arrangements.

The problem encountered with a spring hinge pivot of the type utilized in the above patented disk drives is that it is extremely prone to damage and consequent loss of alignment by a side loading, i.e. being impacted by a force in a direction transverse to the arm and substantially in the plane of the disk, which will put a kink, or deformity in the pivot element. Furthermore, every time that it is necessary to disassemble the drive and remove the movable arm either for cleaning out gross contamination or replacement of the arm, the time-consuming task of transducer alignment must be repeated. Thus, during assembly and/or repair of the disk drive, when the arms are exposed, extreme care must be taken to prevent any misalignment of the movable head arm. Misalignment will, of course, cause the transducers to be misplaced relative to the desired track, yielding incorrect read/write information. Also, deformation of the pivot hinge has been shown to set up deleterious resonance vibrations in the head as it flies across the disk, resulting, in addition to aberrant read/write characteristics, in severe wear problems which tend to rapidly remove the magnetic coating from the disk.

Therefore, it is the object of this invention to provide an improved pivot arrangement wherein alignment of the transducers on the movable arm of a disk drive will not be adversely affected by accidental side loads to the movable head arm and which, after initial alignment, will maintain alignment even after removal and replacement of the movable head arm. This may be accomplished, in one form, by providing a fixed support, a movable transducer support arm mounted relative to one side of the disk for movement of the transducer toward and away from the plane of the disk and the support, and a pivot arrangement between the arm and its support for supporting the arm for movement, the pivot arrangement comprising spherical bearing surfaces seated in positioning bearing recesses.

These and other features of the present invention may be better understood by reference to the following specification, taken in conjunction with the accompanying drawings, in which.

Figure 1:
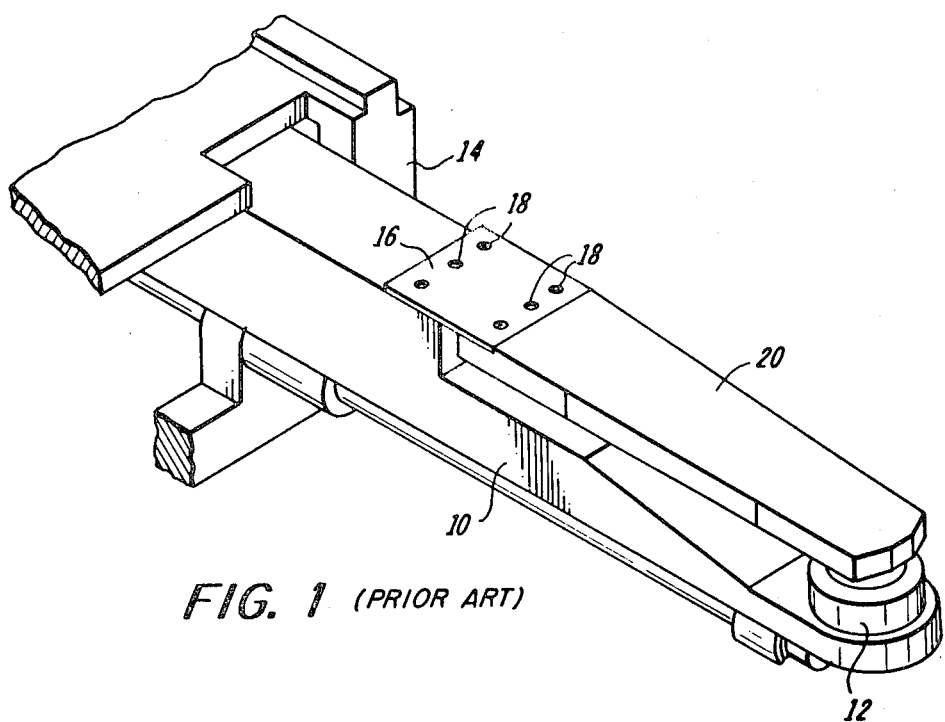
FIG. 1 is a perspective view showing the typical prior art movable head arm mounting arrangement incorporating a spring hinge.

With particular reference to the drawings, there is shown in FIG. 1 a representation of the prior art, shown in the context of a double-sided disk drive arrangement. A fixed head arm, or carriage, 10, carrying transducer support button 12, is mounted for reciprocating movement (in the direction of arm extension) relative to a head and carriage support 14. Secured to the carriage 10 by means of planar hinge spring 16 and suitable fasteners, such as screws 18, is a movable head arm 20 also carrying a transducer (not shown). By virtue of the hinge spring and suitable mechanical components (also not shown) the movable arm 20 may be pivoted toward and away from the carriage 10. In addition to being sufficiently flexible to allow for the required pivoting movement, the spring hinge 16 provides a necessary bias force to urge the arm 20 toward the arm 10.

Figure 2:
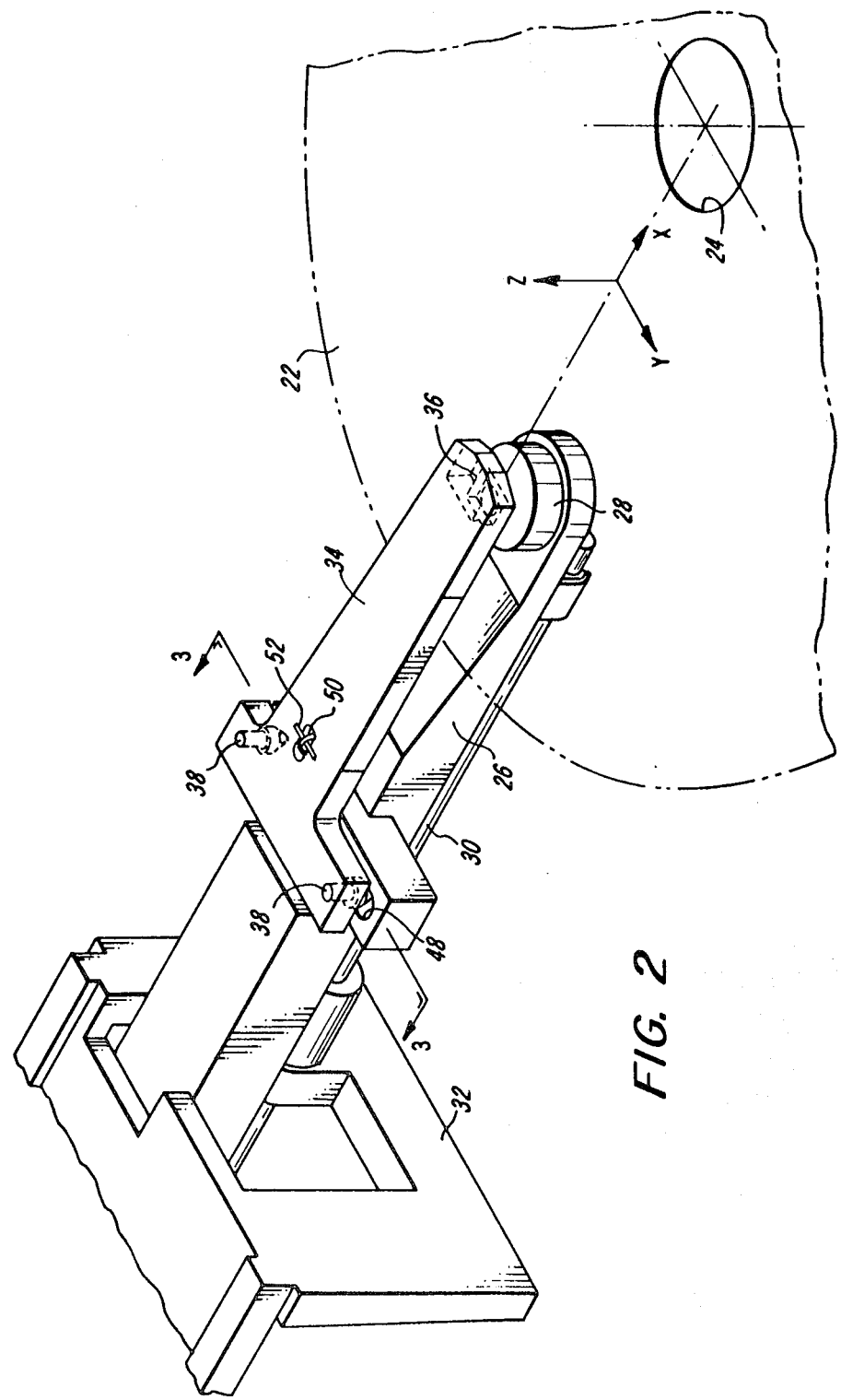
FIG. 2 is a perspective view showing one form of the improved spherical pivot suspension arrangement for the movable head arm of a disk drive.
Figure 3:
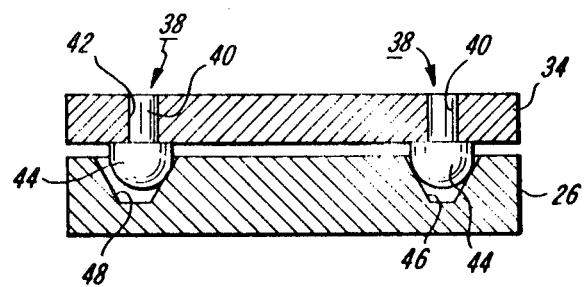
FIG. 3 is a sectional view taken substantially along line 3—3 of FIG. 2.

It will become apparent with reference to FIGS. 2-5 that the pivot mounting of the present invention is a great improvement over the known prior art methods. In FIG. 2 there is illustrated, as exemplary, a double-sided floppy disk system incorporating a disk 22 (shown in phantom lines) having a central opening 24 which cooperates with a drive spindle and clamping arrangement, for rotating the disk. Directions of movement for separation and alignment of the heads will be referenced to the three orthogonal directions X, Y and Z, as illustrated. The X-direction is parallel to the radius of the disk along which the head moves, the Y-direction is perpendicular to the X-direction in the plane of the disk and the Z-direction is parallel to the axis of the disk. A fixed head arm, or carriage 26 (similar to that in FIG. 1) carrying at one end a transducer support button 28 is mounted for reciprocating radial movement (X-direction) along support spindle 30, relative to the disk 22 and head and carriage support 32. Any suitable type of radial accessing mechanism, such as a lead screw or tape drive, may be incorporated for driving the transducer to the selected concentric track position. The movable head arm, or load arm 34, also carries a transducer 36 (positioned as shown in dotted lines). Arm 34 is mounted for pivoting movement so as to be movable toward and away from the arm 26 and disk 22.

The unique pivot arrangement comprises a pair of step pins 38 (best seen in FIG. 3) having cylindrical pin portions 40 at one end seated in accurately located bores 42 in the load arm 34. At the other end of each step pin is an hemispherical bearing surface 44 which protrudes from the arm 34 toward the carriage 26 and is received in bearing seats provided in the carriage. One seat comprises a conical recess 46 and the other seat comprises a V-groove 48. It has been found that with the conical walls and V-groove walls subtending an angle of 60" satisfactory seats are provided. Thus, with the pivot pin 38 seated in the conical recess 46, the hemispherical surface 44 will be accurately located in the X-, Y- and Z-directions. Similarly, the V-groove 42 will positively seat the other hemispherical surface 44 in the X- and Z-directions while allowing for slight variations in the Y-direction. The arms 26 and 34 may be urged toward one another by any suitable resilient means such as the tension spring 50 (partially shown) held in place by securing pin 52.

Figure 4:
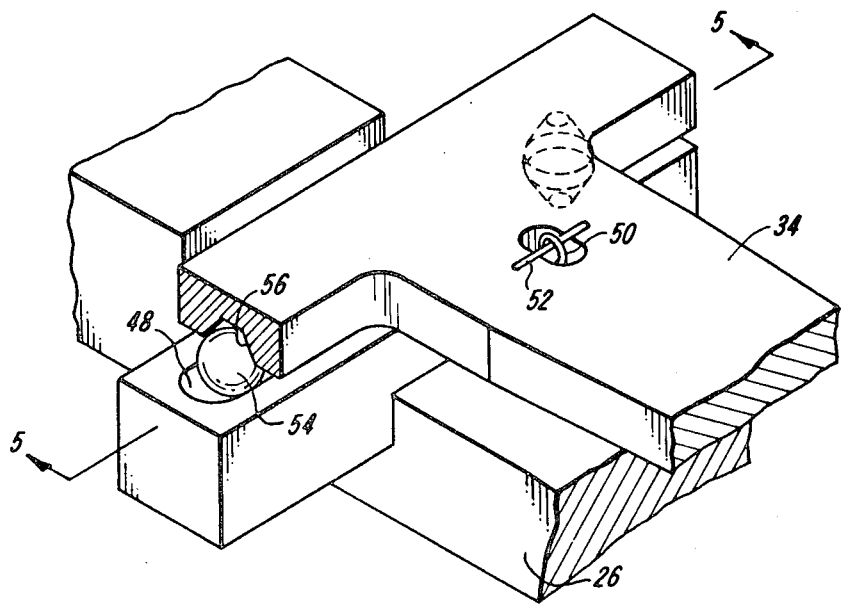
FIG. 4 is an enlarged perspective view showing an alternative form of the spherical pivot suspension arrangement for the movable head arm.
Figure 5:
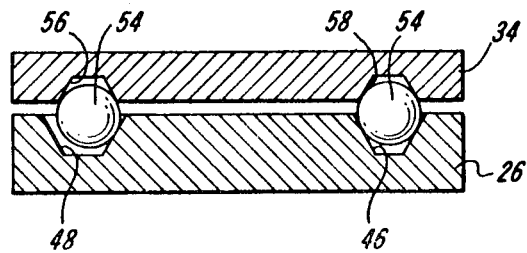
FIG. 5 is a sectional view taken substantially along line 5—5 of FIG. 4.

An alternative embodiment of the present invention is illustrated in FIGS. 4 and 5. It differs from the embodiment of FIGS. 2 and 3 only in the specific pivot arrangement, therefore, common elements in the drawings bear common numeral designations. In lieu of step pins 38, spherical bearing balls 54 are used. The seats in carriage 26, namely conical recess 46 and V-groove 48 are identical with the embodiment of FIG. 3. Additionally, the load arm 34 is provided with two conical recesses 56 and 58 similar to conical recess 46. The bearing surfaces are best seen in FIG. 5.

In each embodiment, the arms are preferably made of a hard molded plastic and the pivot pins 38 and bearing spheres 54 are made of stainless steel or other suitable material. Proper positioning of the arms, relative to one another, takes place automatically upon assembly, by virtue of the spherical bearing surfaces nesting in the accurately molded seats. It is this tendency for invariable seating accuracy which also allows this arrangement to thwart the otherwise catastrophic results of side loading prevalent in the prior art constructions. In the present arrangement, a side load may cause an instantaneous misalignment, but this condition is eliminated when the load arm 34 "pops" back into proper position. Over an extended period of use, the nesting force attributable to the tension spring 50, or its equivalent, will cause the metal spherical bearing surfaces to wear a nest or socket into the plastic seats. This will cause a slight shifting of the arms 26 and 34 relative to one another. However, since the shift is in the penetration (or Z-) direction there will be no loss of alignment. As the nest is created, the seat will conform more to the spherical shape. As the seat wears in this manner, the surface area of contact between the seat and the spherical surface will increase, thus dissipating the force and reducing subsequent wear.

Having described the construction of the improved pivot suspension mounting arrangement, the steps necessary for proper alignment of the transducers of the present invention, as compared to the prior art hinged constructions, shall be discussed. In the prior art drives as well as in the present invention, it is necessary to make primary alignments of the transducers relative to their support arms. Thus the first alignment step takes place prior to assembly of the drive. The transducer head upon each the carriage 26 and the load arm 34 must be aligned relative to appropriate reference surfaces on the respective arm, in the X- and Y-directions and in the azimuth direction (i.e. rotation about the Z-axis). Once aligned, the heads are bonded to the arms. Then the carriage is mounted upon the head and carriage support 32. No further alignment steps are necessary with the present invention, since the parts invariably seek home and the vertically oriented spherical pivots will cause the arms 26 and 34 to be seated accurately and in good alignment relative to one another. However, in the prior art arrangement, on the other hand, the heads on load arm 20 and carriage 10 have to be aligned one to the other in both the X- and Y-directions and then the screws 18, securing the hinge plate 16, must be tightened. It has often been observed, that as the threaded fasteners are tightened, shifting of the load arm 30 occurs and alignment is lost, therefore extreme care must be taken.

Since the only alignment necessary is transducer position relative to its respective arm and arm to arm alignment has been eliminated, it should be apparent that a very great advantage has been achieved by the present invention, namely, the load arm may be removed from the assembly for cleaning and inspection and field interchangeability has been enhanced, all without the loss of head alignment with its attendant read/write errors and adverse resonance effects.

It should be understood that the present disclosure has been made relative to a double-sided floppy disk drive. This was done only by way of example, since the improved pivoting suspension, herein described, finds equal applicability in rigid disk drives and single-sided floppy disk drives. Furthermore, it should be understood that numerous changes in details of construction and the combination and arrangement of parts may be resorted to without departing from the true spirit and the scope of the invention as hereinafter claimed.

What is claimed is:

1. A pivot arrangement for mounting a magnetic transducer in overlying relationship to a planar magnetic recording medium for arcuate movement toward and away from the plane of the medium comprising support means, a movable transducer support arm carrying said magnetic transducer at one end, pivot means located between said support means and the other end of said support arm, about which said movable support arm is mounted for movement, said pivot means including a pair of spherical bearing surfaces, and a mating pair of positioning bearing recesses located in at least one of said support means and said other end of said movable support arm for receiving said pair of spherical bearing surfaces, at least one of said bearing recesses being partially conical, and biasing means for urging said support arm toward the plane of the medium.

2. The pivot arrangement as defined in claim 1 wherein said spherical bearing surfaces comprise balls and said positioning bearing recesses are formed in both said support means and said other end of said movable support arm.

3. The pivot arrangement as defined in claim 2 wherein said positioning bearing recesses include two conical seats formed in one of said support means or said movable support arm and one conical seat and one V-groove formed in the other of said support means or said movable support arm.

4. A pivot arrangement for mounting magnetic transducers in aligned position on the opposite sides of a non-rigid planar magnetic recording medium including a first transducer support arm mounted relative to one side of the medium and having a fixed position in a direction normal to the plane of the medium, a second transducer support arm movably mounted relative to the opposite side of the medium for arcuate movement of the transducer toward and away from the plane of the medium, pivot means positioned between said first and second support arms, about which said second support arm is mounted for movement, said pivot means comprising a pair of spherical bearing surfaces, and a mating pair of positioning bearing recesses located in at least one of said first and said second support arms at least one of said bearing recesses being partially conical, and biasing means for urging said first and second support arms together for maintaining intimate contact between said pair of spherical surfaces and said bearing recesses.

5. The pivot arrangement as defined in claim 4 wherein said positioning bearing recesses are in the form of tapered seats.

6. The pivot arrangement as defined in claim 5 wherein one of said tapered seats is conical and another is a V-groove.

7. The pivot arrangement as defined in claim 5 or claim 6 wherein said spherical bearing surfaces comprise balls and said positioning bearing recesses are located in both support arms.

8. The pivot arrangement as defined in claim 7 wherein one of said support arms is provided with two conical seats and the other support arm is provided with one conical seat and one V-groove seat.

9. The pivot arrangement as defined in claim 5 or claim 6 wherein said spherical bearing surfaces comprise partially spherical caps and wherein each of said caps is connected to mounting means and said mounting means is secured in one of said support arms.

* * * * *